United States Patent
Chen et al.

(10) Patent No.: US 9,759,836 B2
(45) Date of Patent: Sep. 12, 2017

(54) MULTIPLE SPECTRUM CHANNEL, MULTIPLE SENSOR FIBER OPTIC MONITORING SYSTEM

(71) Applicant: Schlumberger Technology Corporation, Sugar Land, TX (US)

(72) Inventors: Yuehua Chen, Sagamihara (JP); Colin Wilson, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/208,518

(22) Filed: Jul. 12, 2016

(65) Prior Publication Data
US 2016/0320526 A1 Nov. 3, 2016

Related U.S. Application Data

(62) Division of application No. 13/237,082, filed on Sep. 20, 2011, now Pat. No. 9,417,103.

(51) Int. Cl.
*G01N 21/00* (2006.01)
*G01B 11/16* (2006.01)
(Continued)

(52) U.S. Cl.
CPC ............... *G01V 8/24* (2013.01); *E21B 47/06* (2013.01); *E21B 47/065* (2013.01);
(Continued)

(58) Field of Classification Search
CPC ... G01L 11/025; G01L 1/246; G01D 5/35387; G01D 5/35303; G01D 5/35312; G01K 11/3206
(Continued)

(56) References Cited

U.S. PATENT DOCUMENTS 3,885,874 A 5/1975 Haas et al.
3,961,185 A 6/1976 Brokenshire et al.
(Continued)

FOREIGN PATENT DOCUMENTS

EP 695853 A2 2/1996
EP 774565 A2 5/1997
(Continued)

OTHER PUBLICATIONS

"Polarisation Maintaining PCF", Photonic Crystal Fibers by blazephotonics, 4 pages.
(Continued)

*Primary Examiner* — Sunghee Y Gray
(74) *Attorney, Agent, or Firm* — Cathy Hewitt (57) ABSTRACT

A multiple sensor fiber optic sensing system includes an optical fiber having at least first fiber optic sensors and second fiber optic sensors deployed along its length. In response to an interrogating pulse, the first fiber optic sensors generate responses in a first optical spectrum window, and the second fiber optic sensors generate responses in a second, different optical spectrum window. The responses in the first optical spectrum window are measured in a first optical spectrum channel, and the responses in the second optical spectrum window are measure in a second, different optical spectrum channel and provide simultaneous indications of one or more parameters, such as temperature and pressure, in the environment in which the sensors are deployed.

8 Claims, 6 Drawing Sheets

(51) Int. Cl.

| | | |
|---|---|---|
| *G01J 4/00* | (2006.01) | |
| *G01J 3/00* | (2006.01) | |
| *G01J 3/30* | (2006.01) | |
| *G02B 6/00* | (2006.01) | |
| *G01V 8/24* | (2006.01) | |
| *G01K 11/32* | (2006.01) | |
| *G01L 11/02* | (2006.01) | |
| *G01L 1/24* | (2006.01) | |
| *G01D 5/353* | (2006.01) | |
| *E21B 47/06* | (2012.01) | |

(52) U.S. Cl.
CPC ..... *G01D 5/35303* (2013.01); *G01D 5/35387* (2013.01); *G01K 11/3206* (2013.01); *G01L 1/246* (2013.01); *G01L 11/025* (2013.01); *G01D 5/35312* (2013.01)

(58) Field of Classification Search
USPC ..... 356/73.1, 32–34, 241.1–241.6, 364, 369, 356/72, 73; 385/12, 13; 250/227.14
See application file for complete search history.

(56) References Cited

U.S. PATENT DOCUMENTS

| | | |
|---|---|---|
| 4,612,810 A | 9/1986 | Martens |
| 4,659,923 A | 4/1987 | Hicks, Jr. |
| 4,918,751 A | 4/1990 | Pessot et al. |
| 5,054,922 A | 10/1991 | Kersey |
| 5,304,171 A | 4/1994 | Gregory et al. |
| 5,367,399 A | 11/1994 | Kramer |
| 5,371,720 A | 12/1994 | Cuomo |
| 5,373,576 A | 12/1994 | Minns et al. |
| 5,380,995 A | 1/1995 | Udd et al. |
| 5,515,459 A | 5/1996 | Farhadiroushan |
| 5,570,437 A | 10/1996 | Kluth et al. |
| 5,582,064 A | 12/1996 | Kluth |
| 5,757,487 A | 5/1998 | Kersey |
| 5,804,713 A | 9/1998 | Kluth |
| 5,841,131 A | 11/1998 | Schroeder et al. |
| 5,898,517 A * | 4/1999 | Weis ..................... E21B 47/123 356/32 |
| 5,898,804 A | 4/1999 | Wickham |
| 5,910,840 A * | 6/1999 | Furstenau ................. G01J 3/45 356/364 |
| 6,056,436 A | 5/2000 | Sirkis |
| 6,204,920 B1 | 3/2001 | Ellerbrock et al. |
| 6,212,306 B1 | 4/2001 | Cooper et al. |
| 6,215,809 B1 | 4/2001 | Ziari et al. |
| 6,327,061 B1 | 12/2001 | Desurvire |
| 6,350,056 B1 | 2/2002 | Helmig et al. |
| 6,442,304 B1 | 8/2002 | Crawley et al. |
| 6,538,739 B1 | 3/2003 | Visuri et al. |
| 6,630,658 B1 | 10/2003 | Bohnert et al. |
| 6,765,724 B1 | 7/2004 | Kramer |
| 6,842,239 B2 | 1/2005 | Bastue et al. |
| 6,978,062 B2 | 12/2005 | Rose et al. |
| 7,003,184 B2 | 2/2006 | Ronnekleiv et al. |
| 7,046,349 B2 | 5/2006 | Everall et al. |
| 7,127,132 B1 | 10/2006 | Moslehi et al. |
| 7,187,816 B2 | 3/2007 | Huang |
| 7,684,656 B2 | 3/2010 | Chen |
| 7,714,271 B1 | 5/2010 | Levine |
| 2002/0041723 A1 | 4/2002 | Ronnekleiv et al. |
| 2002/0041724 A1 | 4/2002 | Ronnekleiv et al. |
| 2002/0154860 A1 | 10/2002 | Fernald et al. |
| 2003/0011768 A1 | 1/2003 | Jung |
| 2003/0035626 A1* | 2/2003 | Smith ..................... G01L 1/246 385/37 |
| 2003/0076594 A1 | 4/2003 | Kramer |
| 2003/0095263 A1 | 5/2003 | Varshneya et al. |
| 2004/0045705 A1 | 3/2004 | Gardner et al. |
| 2004/0113056 A1 | 6/2004 | Everall et al. |
| 2005/0200855 A1* | 9/2005 | Mcinnes ............ G01D 5/35306 356/479 |
| 2007/0272406 A1 | 11/2007 | McCoy et al. |
| 2007/0277974 A1 | 12/2007 | DiFoggio |
| 2007/0292071 A1 | 12/2007 | Zerwekh et al. |

FOREIGN PATENT DOCUMENTS

| | | |
|---|---|---|
| GB | 2305724 A | 4/1997 |
| GB | 2311546 A | 10/1997 |
| GB | 2399877 A | 9/2004 |
| GB | 2427910 A | 1/2007 |

OTHER PUBLICATIONS

Chmielewska, et al., "Measurement of pressure and temperature sensitivities of a Bragg grating imprinted in a highly birefringent side-hole fiber", Applied Optics, vol. 42, No. 31, Nov. 1, 2003, pp. 6284-6291.

Clowes, John, "Fibre-Optic Pressure Sensor for Downhole Monitoring in the Oil Industry", University of Southampton, Optoelectronic Research Center, Doctoral Thesis, Jan. 2000, 180 pages.

I-Mon E, "Interrogation monitors for FBG sensor systems", Ibsen Photonics, Product Sheet v. 2.0, pp. 1-2.

I-MON E-USB 2.0, "Product Specification, Version 1.0", Ibsen Photonics, Document No. P210-512E-03, Dec. 21, 2009, pp. 1-17.

Jansen, et al., "High Pressure Fiber-Optic Sensor with Side-Hole Fiber", Fiber Optic Senors II, SPIE, vol. 798, 1987, pp. 56-61.

Thevenaz, et al., "Novel schemes for optical signal generation using laser injection locking with application to Brillouin sensing", Measurement Science and Technology, vol. 15, 2004, pp. 1519-1524.

Xie, et al., "Side-Hole Fiber for Fiber-Optic Pressure Sensing", Optics Letters, vol. 11, No. 5, 1986, pp. 333-335.

Examination Report for corresponding GB Application Serial No. GB1404268.3, dated Mar. 6, 2017, 4 pages.

* cited by examiner

MULTIPLE SPECTRUM CHANNEL, MULTIPLE SENSOR FIBER OPTIC MONITORING SYSTEM

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. One piece of equipment which may be installed is a sensing system, such as a fiber optic based sensing system.

Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, ruggedness, and immunity to electromagnetic interference. In addition, fiber optic sensors have the potential for very high sensitivity, large dynamic range, and wide bandwidth. Yet further, certain classes of sensors can be distributed or multiplexed along the length of an optical fiber so that an appropriate interrogation system can be employed to monitor selected environmental parameters at multiple locations. When deployed in a hydrocarbon well, the parameters can provide indications of characteristics of production fluids and/or properties of the surrounding earth formation. Various drilling, production and remedial operations can then be performed based on the information derived from the monitored parameters.

BRIEF DESCRIPTION OF THE DRAWINGS

Certain embodiments are described with reference to the accompanying drawings, wherein like reference numerals denote like elements. It should be understood, however, that the accompanying drawings illustrate only the various implementations described herein and are not meant to limit the scope of various technologies described herein.

DETAILED DESCRIPTION

In the following description, numerous details are set forth to provide an understanding of the subject matter disclosed in this application. However, it will be understood by those skilled in the art that the disclosed subject matter may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments disclosed herein.

Various embodiments comprise a fiber optic sensor system that includes a fiber optic sensor assembly having multiple sensors deployed along the length of an optical fiber. The sensors are configured to provide for simultaneous measurements of temperature and pressure which can be used, for instance, to compensate for temperature-pressure cross-sensitivity in the measurement. The sensing system further includes a multiple spectrum channel interrogation system that is configured to interrogate and obtain measurements from the sensors in both the time domain and the optical spectrum domain. In this manner, simultaneous temperature and pressure measurements can be acquired from multiple sensors deployed along a single optical fiber and the locations of the sensed parameters identified.

Many existing temperature and pressure fiber sensing systems generally use either a tunable laser or a tunable optical filter with a wide bandwidth source as a wavelength scanning optical source to obtain measurements from a temperature and pressure sensor. The source is operated in a continuous wave (CW) mode, which limits the sensing system to one sensor unit for each optical fiber. In addition, this type of sensing system cannot detect the location of the sensor unit along the optical fiber.

As demand for more information from smaller size sensing systems grows, so does the demand for sensing systems which can deploy more than one sensor. To handle measurements from multiple sensors, the sensing system is operated in a time domain in which the optical source is operated in a pulsed mode so that the measurements from the individual sensors can be separately discerned based on the travel time of the optical pulses propagating in the optical fiber. Accordingly, embodiments of the sensing system deploy a sensor assembly having multiple temperature and pressure sensors along the length of an optical fiber and interrogate the sensors using a pulsed optical source. To separate temperature measurements from pressure measurements, separate optical spectrum channels are implemented.

In various implementations of the sensing system, the temperature and pressure sensors that are deployed include two different types of sensors: a fiber grating sensor and a polarimetric fiber sensor. In general, a fiber grating sensor is a sensor that is formed in the core of the optical fiber by doping an optical fiber with a material such as germanium and then exposing the side of the fiber to an interference pattern to produce sinusoidal variations in the refractive index of the core. Two methods of providing the interference pattern are by holographic imaging and by phase mask grating, either of which changes the refractive index along the fiber to form a narrow bandwidth optical reflector. The central wavelength of the grating is determined by the pitch and the average refractive index of the grating. The central wavelength at which the grating reflects an optical signal is primarily a function of temperature, but is also slightly sensitive to pressure.

A polarimetric fiber sensor generally is built on the length of a side hole fiber or polarization maintaining (PM) crystal fiber (i.e., side-hole crystal fiber). A side-hole fiber has two parallel holes which run the length of the fiber and are parallel to the core of the fiber. The axes of the holes and the core lie in a common plane. This geometry results in converting external hydrostatic pressure into anisotropic stress at the core, thereby inducing birefringence. Although changes in temperature can affect the birefringence of the core, the sensitivity of the side hole fiber sensor to pressure is substantially greater than its sensitivity to temperature. Consequently, the side-hole fiber optic pressure sensor can be used effectively in applications where temperature variations are minimal. However, the relative insensitivity of the side-hole fiber to temperature makes it unsuitable for measuring temperature.

Accordingly, various embodiments employ a combination of these two types of sensors to provide simultaneous temperature and pressure measurements. By operating the interrogation system in a pulsed mode, multiple combined sensor units may be deployed along a single optical fiber. Because the combined sensor units include different types of sensors that have different optical bandwidths, the interrogation system can implement multiple optical spectrum channels to separate and measure the information from each type of sensor. For instance, in the optical spectrum domain, a fiber grating sensor has a relatively narrow optical bandwidth of less than 10 nm (e.g., approximately 0.2 nm, as an example), while a polarimetric sensor has a relatively wide optical bandwidth that is typically greater than 40 nm. Thus, in some embodiments, a narrow bandwidth optical spectrum channel can be used to measure the spectral response of the fiber grating sensor, and a wide bandwidth optical spectrum channel can be used to measure the spectral response of the polarimetric sensor.

Figure 1:
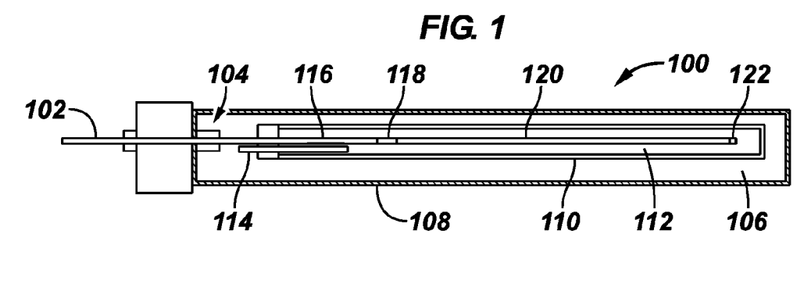
FIG. 1 is a schematic illustration of a temperature and pressure sensing unit that can be used in a multiple-sensor fiber optic monitoring system, in accordance with an embodiment.

An example of a combined temperature and pressure sensor unit 100 that may be employed in various embodiments is shown in the schematic cross-sectional view of FIG. 1. The sensor unit 100 includes an optical fiber section 102 that passes through an optical feedthrough 104 into a chamber 106 defined by a metal housing 108 that is formed, for example, from titanium. Hydrostatic pressure applied to the metal housing 108 is transferred to a glass tube 110 that is disposed within the chamber 106. In the embodiment shown, the inside 112 of the glass tube 110 is filled with a metal (e.g., gallium or a gallium alloy) that is in liquid form in the intended operating environment. The inside 112 of the glass tube 110 is also vented to the chamber 106 of the metal tube 108 through a breather capillary 114 to thereby provide for pressure transfer between the chamber 106 of the metal housing 108 and the inside 112 of the glass tube 110. In this construction, the inside 112 of the glass tube 110 forms a pressure chamber operably coupled to the chamber 106 of the metal housing 108, and the metal housing 108 protects the components therein from the environment outside the housing 108. As such, the sensor unit 100 is suitable for harsh environments, such as downhole monitoring in oil and gas drilling and production applications. The optical fiber section 102 extends into the inside 112 of the glass tube 110 where it is coupled to a sequence of optical processing elements, including a fiber grating 116, an in-line polarizer 118, a section of side-hole fiber or polarization-maintaining crystal fiber 120, and a fiber mirror 122, disposed inside the glass tube 110. Exemplary embodiments of the sensor unit 100 are described in U.S. Pat. No. 7,684,656.

In some embodiments, the sensor unit 100 may also include a bellows structure (not shown) that is disposed at the end of the metal housing 108 opposite the feedthrough 104. In such embodiments, the bellows structure provides for longitudinal deformation of the housing 108 in response to hydrostatic pressures applied to the sensor unit 110. Such longitudinal deformation varies the volume of the chamber 106, thereby transferring the environmental pressure changes to the glass tube 110.

Embodiments of the multiple-spectrum-channel fiber optic sensing system disclosed herein include a fiber optic sensor assembly that includes multiple temperature-pressure sensor units, such as the sensor unit 100, that are deployed along the length of an optical fiber. One implementation of such a system 200 is shown schematically in FIG. 2.

Figure 2:
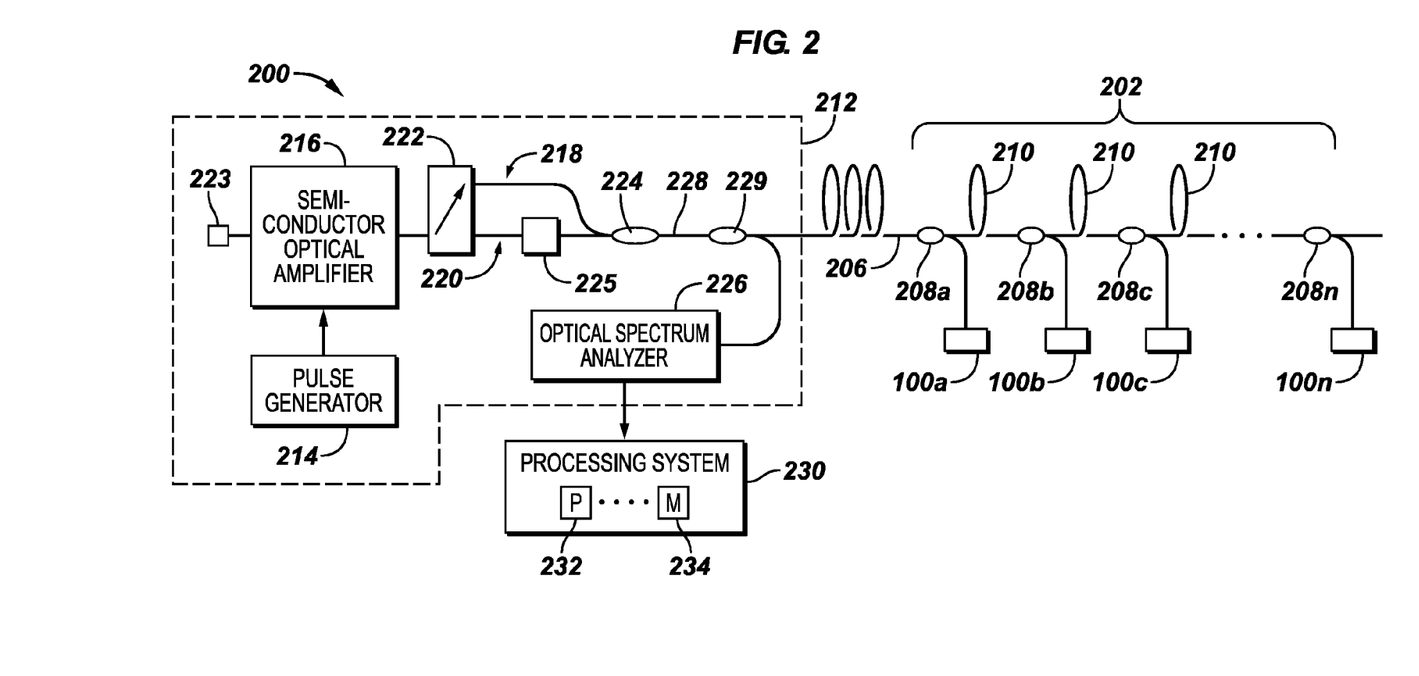
FIG. 2 is a schematic illustration of a multiple spectrum channel fiber optic monitoring system having a sensor assembly with multiple sensing units, in accordance with an embodiment.

As shown in FIG. 2, the sensor system 200 includes an optical fiber sensor assembly 202 having multiple sensing units, such as sensing units 100a-n, deployed along the length of an optical fiber 206. Each sensing unit 100a-n is coupled to the optical fiber 206, such as via a respective tap coupler 208a-n, which may be a high temperature (HT) tap coupler. For instance, the HT tap couplers 208a-n may be fused fiber couplers made with a glass soldering package technique. In the embodiment shown, the tap couplers 208a-n have a splitting ratio of 5:95, such that 5% of the power of the interrogating pulse is directed to the sensing unit. Other splitting ratios also are contemplated, including smaller ratios. In general, the splitting ratio will be selected based on the number of sensor units 100a-n that are deployed along the optical fiber 206. Although four sensor units 100 are shown in FIG. 2, it should be understood that optical fiber sensor assembly 202 may include fewer or more sensor units depending on the particular application in which the sensor 202 is deployed. In various applications, such as applications in which the sensor units 100a-n are deployed in a downhole environment (e.g., in a hydrocarbon well), the couplers 208a-n and sensor units 100a-n can be configured to withstand and operate in temperatures up to 350° C. and pressures up to 25,000 psi.

With reference again to FIG. 2, the optical fiber sensor assembly 202 further includes delay fibers 210 that are disposed between couplers 208 to introduce a delay in the propagation of the optical signals. These delays facilitate distinguishing the returning signals generated by the sensor units 100a-n from one another based on their respective travel times. The location of each sensor unit 100a-n also can be discerned based on the travel times and the known velocity of light propagating in the optical fiber.

The sensor system 200 further includes an interrogation system 212 coupled to the optical fiber sensor assembly 202 via the optical fiber 206. As shown in FIG. 2, the interrogation system 212 includes an optical pulse generator 214 which drives a semiconductor optical amplifier (SOA) 216, which is capable of generating optical pulses at a wavelength suitable for interrogating the sensor units 100a-c. The SOA 216 can be implemented, for example, by part number SOA-S-C-14-FCA available from CIP Technologies of Suffolk, UK, although other semiconductor optical amplifiers can also be used that are suitable for the particular application in which the sensor system 200 is employed. In the embodiment shown in FIG. 2, the SOA 216 can generate optical pulses at an optical wavelength of 1550 nm for launching into the optical fiber sensor 202.

To interrogate the sensing units 100a-n, the optical pulse generator 214 generates a pulse to drive the SOA 216. The SOA 216 then generates an optical pulse (e.g., in the form of an amplified spontaneous emission) that is launched into the optical fiber 206. A portion of the interrogating pulse propagates to each of the sensing units 100a-n via their respective tap couplers 208a-n. In response, each sensing unit 100a-n reflects some of the power of the interrogating pulse (e.g. on the order of 1-5%) back to the interrogation system 212. Because of the delay fiber 210 imposed between each of the sensing units 100a-n, the flight time for the reflected signals is different for each of the sensing units 100a-n, which allows for selection of a particular sensing unit 100 for measurement, as will be further explained below. In addition, because each sensing unit 100a-n includes two different sensors (e.g., a fiber grating sensor 116 to measure temperature and a polarimetric sensor 120 to measure pressure), the returned signal from each sensor unit 100a-n includes a combination of the spectral components generated by both types of sensors 116 and 120 in response to an interrogating pulse.

Because the returned signal received by the interrogating system 212 will be amplified and re-reflected in an active cavity (as will be explained in further detail below), the contributions from the two different sensors 116 and 120 in the re-reflected, re-amplified signal will experience gain competition, which can create complexities when processing the signal to separate the spectral components that are indicative of temperature from the spectral components that are indicative of pressure. Accordingly, to eliminate gain competition between the components of the signal returned from a sensing unit 100, the response from each sensor 116/120 of a sensor unit 100 is measured separately by the interrogation system 212 through the implementation of separate spectral channels.

For instance, with reference again to FIG. 2, the interrogation system 212 includes two optical spectrum channels 218 and 220, which are implemented by an optical switch 222, a wavelength division multiplexor (WDM) 224, and a polarization scrambler 225. The WDM 224 separates the returned signal applied at its input into the two channels 218 and 220 at its outputs based on wavelength. More particularly, the optical spectrum channel 218 at one output of the WDM 224 is a narrowband channel (e.g., on the order of 10 nm) that is used to measure the components of the returned signal that were generated by the fiber grating sensors 116 of the sensing unit 100a-c in response to an interrogating pulse. The optical spectrum channel 220 at the other output of the WDM 224 has a wider bandwidth (e.g., greater than 40 nm) and is used to measure the components of the returned signal that were generated by the polarimetric sensors 120 of the sensing units 100a-c in response to the interrogating pulse.

The optical switch 222 can be implemented, for example, by part number SW2x1-9N-12-16 available from Sercalo Microtechnology Ltd. of Liechenstein (although other suitable optical switches also can be employed). Upon selection of one of the channels 218/220 by the optical switch 222 (e.g., by applying an appropriate control signal to the switch 222), the components of the returned signal that correspond to the selected channel are routed to the SOA 216 for amplification. The driving signal from the pulse generator 214 turns the SOA 216 on and off. When switched on, the returned signal passes through the SOA 216 and is amplified. When switched off, the returned signal is attenuated. Thus, by controlling the pulse repetition rate of the pulse generator 214 based on known travel times of the optical pulses in the fiber optic sensor 202, the SOA 216 can be switched on at an appropriate time to select a signal from a desired particular sensing unit 100a-n.

When switched on to select a particular sensor unit 100a-n, the SOA 216 amplifies the wavelength components of the returned signal in the selected spectrum channel 218/220 and the amplified signal is then reflected from a reflector 223 (e.g., a mirror) back to the SOA 216, where it is again amplified, thus forming an active optical loop in which the reflected, re-amplified optical pulse leaving the SOA 216 contains the wavelengths originally reflected from the selected sensor 116/120 of the selected sensing unit 100a-n in response to the interrogating pulse. Due to the multiple amplifications experienced by the reflected signals within the optical loop, strong optical pulses at the wavelengths corresponding to a selected sensor 116/120 can be created even when the sensor 116/120 has a very low reflectivity. Consequently, sensing units 100 having sensors with relatively low reflectivities (e.g., 1-5%) can be interrogated and the number of sensing units 100 deployed along the optical fiber 206 can be increased. Moreover, the resulting multiple-amplified optical pulse can be more easily detected by a spectral analyzer.

Towards that end, the system of FIG. 2 further includes an optical spectral analyzer (OSA) 226 coupled to the optical path 228 via a coupling device 229, such as a tap coupler or beam splitter, and arranged to detect the spectral envelope of the selected amplified optical signals. The OSA 226 has a relatively wide bandwidth that is suitable for detecting the spectral envelope of the signals returned by the sensing units 100a-n. For instance, in the embodiment shown in FIG. 2, the SOA 216 generates interrogating pulses with an optical wavelength of 1550 nm, the gratings 116 have a nominal central wavelength at about 1516 nm and a bandwidth of less than 10 nm, and the polarimetric sensors 120 have a bandwidth on the order of 40 nm. To detect the spectral envelope of the returned signals, the OSA 226 in this embodiment has a bandwidth of 80 nm in the 1510-1590 nm range and can be implemented, for example, by part number I-MON E-USB 2.0 available from Ibsen Photonics of Farum, Denmark. It should be understood, however, that other suitable wavelength scanning devices with different bandwidths may also be used that are configured to scan the optical spectrum of the signals returned from the particular types of sensors that make up the sensing units 100 in the optical fiber sensor assembly 202.

To derive temperature measurements, the OSA 226 scans over the spectral components in the amplified signal from the fiber grating sensor 116 to identify a maximum peak therein. A change in the peak wavelength is indicative of temperature of the environment in which the fiber grating sensor 116 is deployed.

Similarly, when the optical switch 222 selects the second channel 220, which is the wide bandwidth channel, the signals generated by the polarimetric sensors 120 are routed to the SOA 216 through a polarization scrambler 225, amplified, reflected from the reflector 223, re-amplified by the SOA 216, routed into the single recombined channel 228 by the WDM 224, and detected by the OSA 226 through the tap coupler 229. The OSA 226 scans over the spectral components in the amplified signal from the polarimetric sensor 120 to identify the interference optical spectrum. The differential optical length between x and y-polarization modes is representative of the change in the differential optical length between x and y-polarization beams of the polarimetric sensor 120 and, thus, is indicative of the pressure present in the environment of the polarimetric sensor 120.

In the embodiment shown, the polarization scrambler 225 is present in the second spectrum channel 220 because the signal returned from the polarimetric sensor 120 is highly polarized and the SOA 216 has a high polarization dependent loss. This loss can be eliminated by depolarizing the signal prior to routing it to the SOA 216.

In various embodiments, the OSA 226 can include an optical receiver, such as a photodiode array, that detects the amplified signal and has an output coupled to a signal processing system 230, such as by a wired communication channel (e.g., USB) or wireless communication channel. The signal processing system 230 includes one or more suitable processing devices 232 (e.g., a general purpose processor, special purpose processor, application specific processor, etc.) with associated memory 234 and is configured to evaluate the spectral response obtained from a selected sensing unit 100 to derive measurements of temperature and pressure present in the environment of the sensing unit. As further examples, the signal processing system 230 also can be configured to derive pressure-compensated temperature measurements and/or temperature-compensated pressure measurements. These measurements can be analyzed in real-time in order to inform decisions about actions that should be taken in the environment in which the fiber optic sensor assembly 202 is deployed. For instance, in hydrocarbon exploration and production applications, these actions can include operating a downhole component, such as a valve, to control the flow of production fluid in the wellbore. Alternatively, the measurements can be stored as data in a storage device for later analysis and use.

Figure 3:
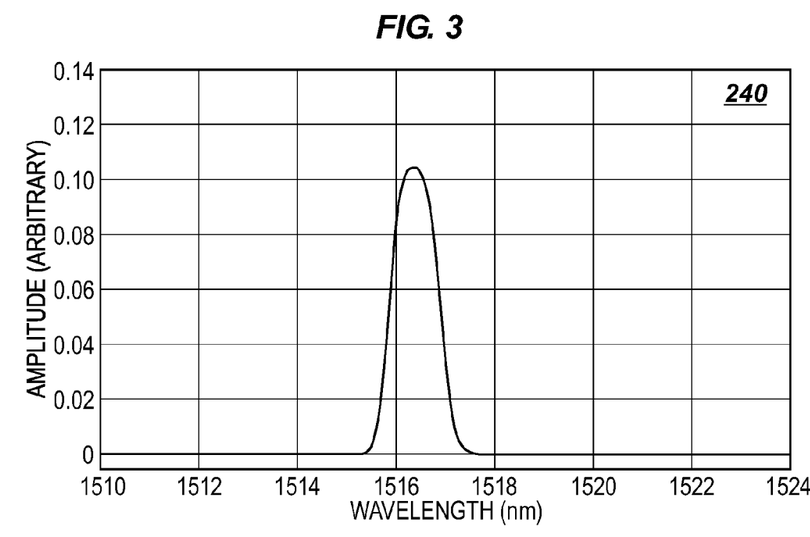
FIG. 3 is a graph showing the optical spectrum of an exemplary fiber grating sensor.
Figure 4:
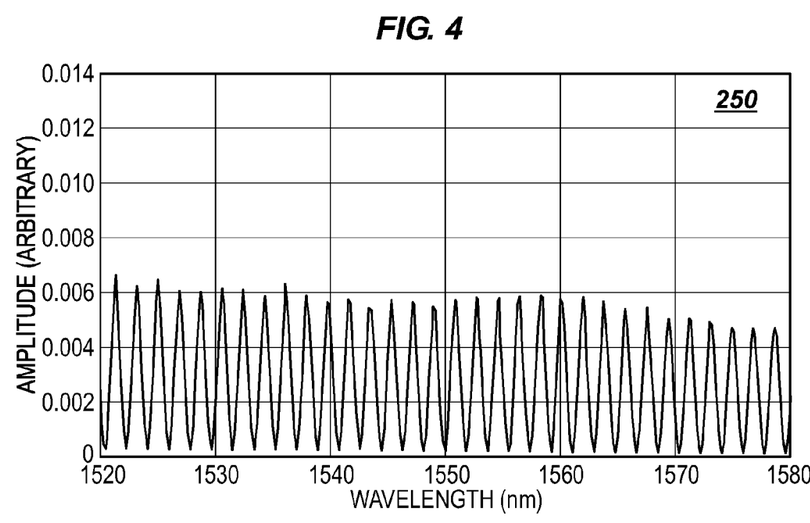
FIG. 4 is a graph showing the optical spectrum of an exemplary polarimetric sensor.

An example of the optical spectrum of a fiber grating sensor 116 with a central wavelength at 1516 nm, as measured by the OSA 226 through the first channel 218, is shown in the graph 240 in FIG. 3, which plots amplitude on the vertical axis against wavelength on the horizontal axis. This measurement can be processed by the processing system 230 to determine the peak wavelength of the fiber grating sensor 116 and, thus, to derive a measurement of temperature. An example of the optical spectrum of a polarimetric sensor 120 measured by the OSA 226 through the second channel 220 is shown in the graph 250 in FIG. 4, which plots amplitude on the vertical axis against wavelength on the horizontal axis. The optical path length of the polarimetric sensor 120, which is indicative of pressure, can be obtained by processing the optical spectrum using a fast Fourier transform algorithm. The two measurements from the two spectrum channels 218, 220 thus can together provide simultaneous measurements of temperature and pressure.

Figure 5:
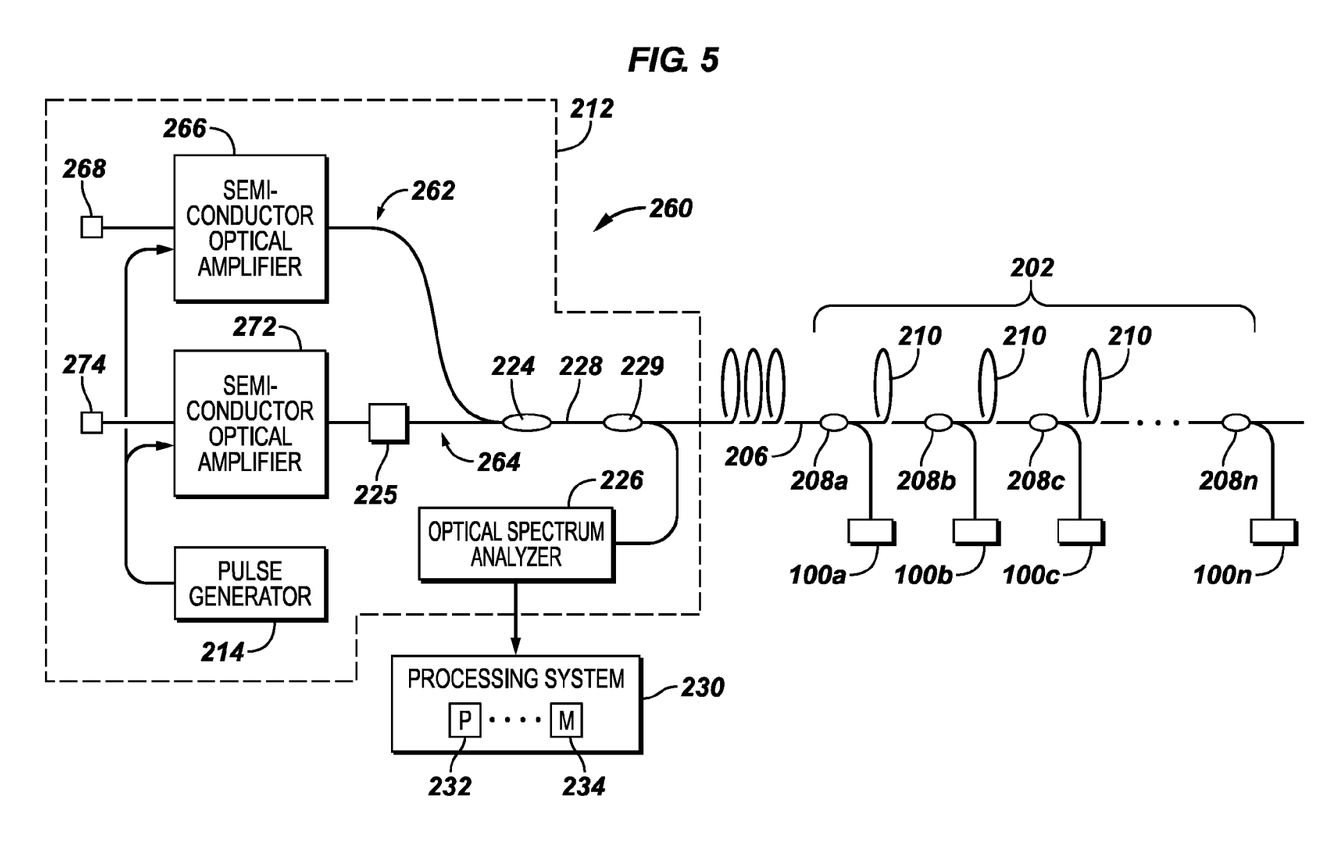
FIG. 5 is a schematic illustration of another multiple spectrum channel fiber optic monitoring system having a sensor assembly with multiple sensing units, in accordance with an embodiment.

Another embodiment of a multiple channel, multiple sensor fiber optic monitoring system 260 is shown in FIG. 5. In this embodiment, the optical switch is not used and two optical spectrum channels 262, 264 are implemented instead using an SOA 266 and reflector 268 in the first channel 262 provided at one output of the WDM 224 and another SOA 272 and reflector 274 in the second channel 264 provided at the other output of the WDM 224. The use of different SOAs 266, 272 to separately amplify the reflected signals from the fiber grating sensors 116 and the reflected signals from the polarimetric sensors 120 can speed up the acquisition of the measurements since the two channels can perform the measurements simultaneously. The pulse generator 214 applies driving pulses simultaneously to both SOAs 266, 272 in order to select a desired sensing unit 100a-n for measurement. The amplified and reflected signals from both sensors 116, 120 in each of the sensor units 100a-n are measured by the OSA 226 and processed by the signal processing system 230 as described above in order to derive the temperature and pressure measurements.

Figure 6:
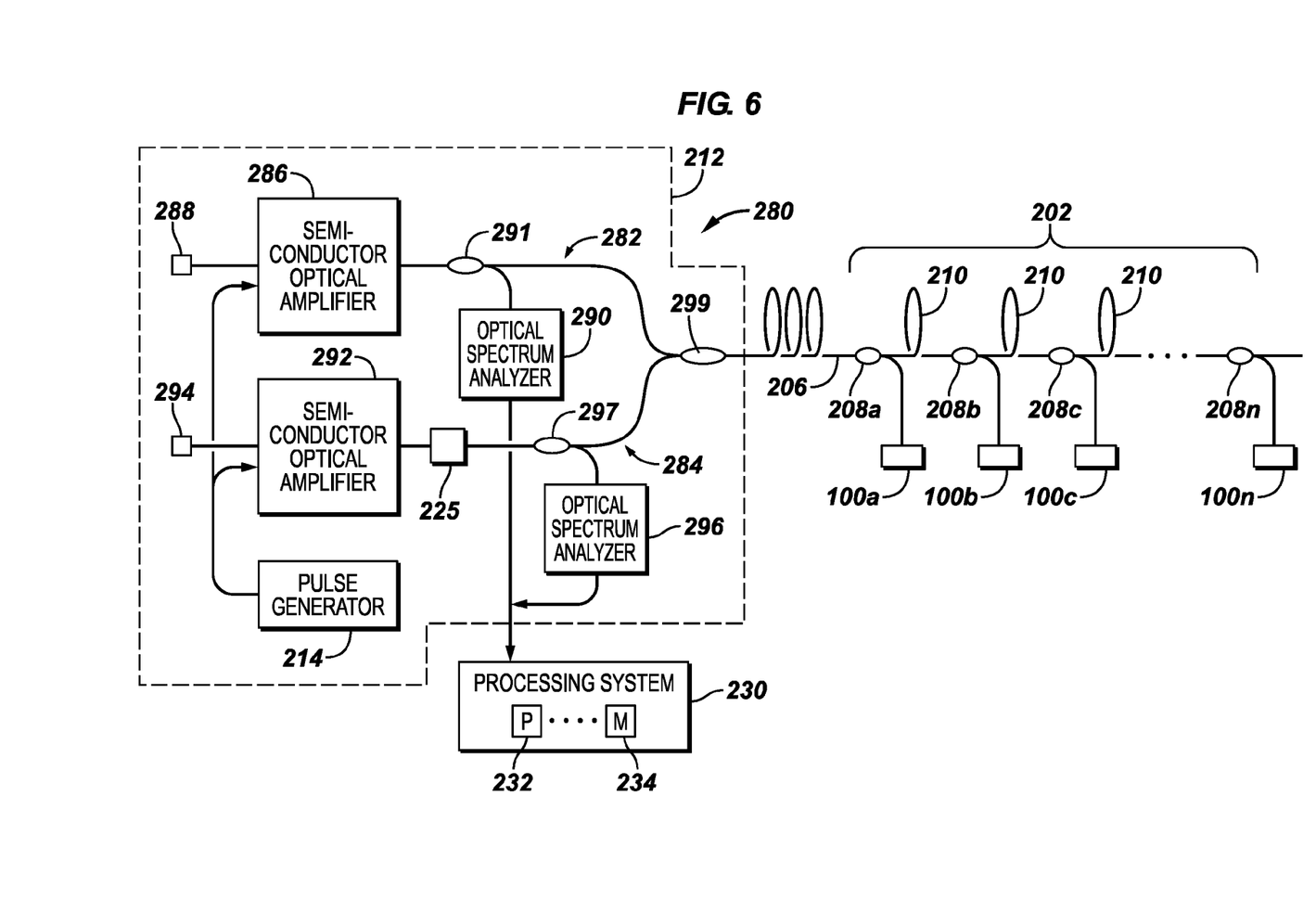
FIG. 6 is a schematic illustration of yet another multiple spectrum channel fiber optic monitoring system having a sensor assembly with multiple sensing units, in accordance with an embodiment.

A further embodiment of a multiple channel, multiple sensor fiber optic monitoring system 280 is shown in FIG. 6. In this embodiment, the two optical spectrum channels 282, 284 are implemented using an SOA 286, a reflector 288 and an OSA 290 (and tap coupler 291) dedicated to the first channel 282, and an SOA 292, a reflector 294 and an OSA 296 (and tap coupler 297) dedicated to the second channel 284, along with the polarization scrambler 225. In one implementation of the system 280 of FIG. 6, the SOA 286 generates optical pulses having a wavelength in the range of 1310 nm, and the SOA 292 generates optical pulses having a wavelength in the range of 1550 nm. A WDM 299 is a 1310/1550 nm WDM, and the OSAs 290 and 296 are narrow bandwidth devices configured to detect spectral components centered about 1310 nm and 1550 nm, respectively. The use of interrogating pulses with different wavelengths increases the number of sensing units 100 that can be deployed along a single optical fiber. The pulse generator 214 applies separate driving signals to each of SOAs 286, 292 in order to select a particular sensing unit 100a-n for measurement. The OSAs 290 and 296 are coupled to the signal processing system 230 so that the optical spectra detected by the OSAs 290 and 296 can be processed and temperature and pressure measurements derived therefrom.

In the embodiments discussed thus far, the sensing units 100a-n have included fiber grating sensors 116 and polarimetric sensors 120 to measure temperature and pressure, respectively, and the various components in the interrogating system 212 operate in wavelength ranges that are suitable for the signals reflected by those types of sensors. It should be understood, however, that the time-domain, multiple spectrum channel interrogating system 212 can be employed with various other types of fiber optic sensors (such as a Fabry-Perot Cavity sensor) that have differing spectral responses. It should be further understood that the particular sensors used may be based on the type of parameter to be monitored in a particular application, and that the monitored parameters can be parameters other than temperature and pressure, such as vibration and strain. Yet further, each of the different sensor types included in the fiber optic sensor assembly may monitor the same type of parameter (e.g., temperature), but with a different type of spectral response to that parameter.

Figure 7:
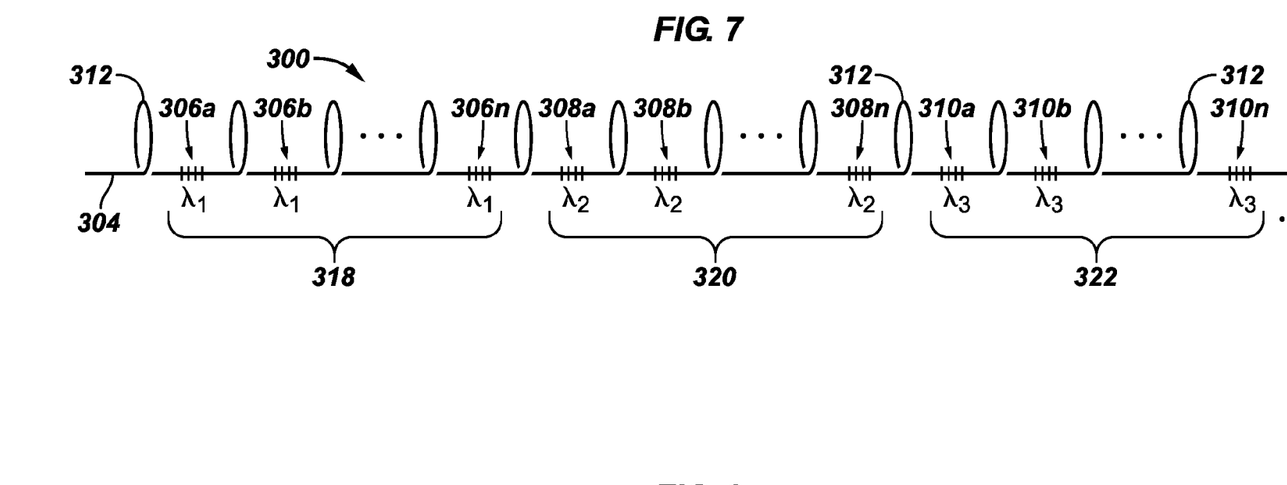
FIG. 7 is a schematic illustration of another fiber optic sensor assembly with multiple sensing units that may be employed in implementations of a multiple spectrum channel fiber optic monitoring system, in accordance with an embodiment.
Figure 8:
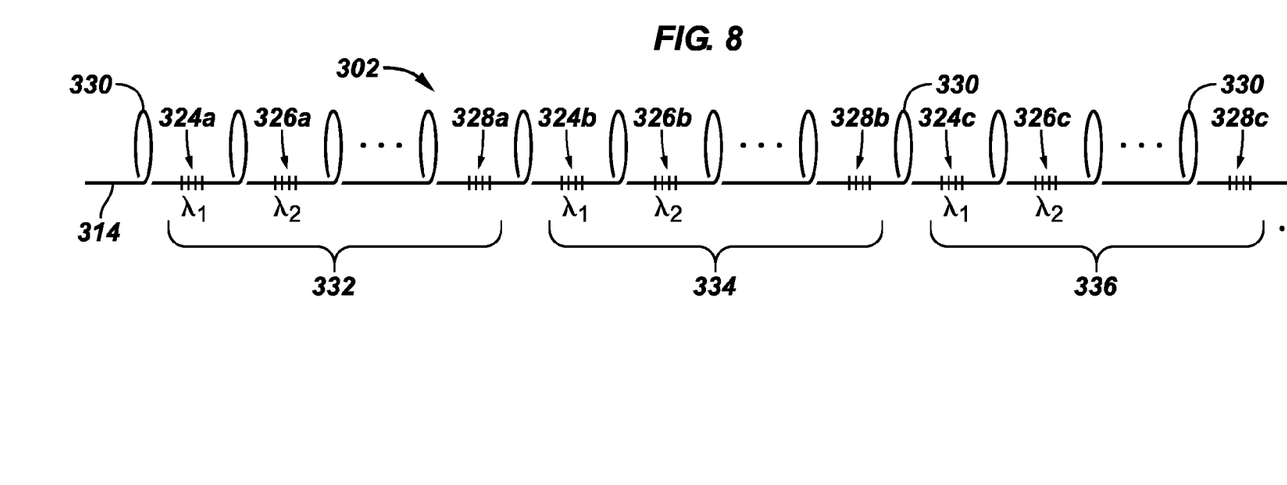
FIG. 8 is a schematic illustration of fiber optic sensor assembly with multiple sensing units that may be employed in implementations of a multiple spectrum channel fiber optic monitoring system, in accordance with an embodiment.

As an example, an embodiment of the time domain, multiple spectrum channel interrogating system 212 described herein can be employed with a fiber optic sensor assembly that employs wavelength multiplexing techniques, such as either of the fiber optic sensor assemblies 300 and 302 shown in FIGS. 7 and 8, respectively. With reference to FIG. 7, the fiber optic sensor assembly 300 includes an optical fiber 304 with multiple fiber gratings 306a-n, 308a-n, and 310a-n disposed along its length with delay fibers 312 disposed between gratings. In this embodiment, the gratings 306a-n, 308a-n, and 310a-n are arranged in groups 318, 320, and 322, where the gratings within a particular group have substantially the same central wavelength. When employed with an implementation of the time domain, multiple spectrum channel interrogating system 212 described herein, the responses from each group 318, 320, 322 of gratings may be separately measured in separate spectrum channels. A particular group 318, 320, 322 of sensors and particular sensors 306, 308, 310 within a selected group can be selected by controlling the pulse generator that drives the SOA(s) in the interrogation system 212, in the manner described above. The interrogation system 212 may include a separate spectrum channel for each group of sensors and any number of groups with any number of sensors can be implemented, depending on the particular application in which the sensor 300 is deployed.

With reference to FIG. 8, the fiber optic sensor assembly 302 again includes an optical fiber 314 with multiple fiber gratings 324a-c, 326a-c, 328a-c disposed along its length with delay fibers 330 disposed between gratings. The gratings are arranged in groups 332, 334, 336. In this embodiment, each grating 324, 326, 328 within each group has a different central wavelength from the other gratings in its group. Accordingly, when employed with an implementation of the time domain, multiple spectrum channel interrogating system 212 described herein, the responses from each sensor within a selected group are measured in separate spectrum channels. A particular group of sensors and particular sensors within a selected group can be selected by controlling the pulse generator that drives the SOA(s), in the manner described above. Again, any number of groups and any number of sensors within each group may be deployed depending on the particular application and the capabilities of the interrogating system 212.

In some embodiments, the systems and techniques described herein may be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system may comprise one or more of various components or subsystems, which include without limitation: casing, tubing, control lines (electric, fiber optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well may communicate with systems or sub-systems that are located at the surface. The surface systems or sub-systems in turn may communicate with other surface systems, such as systems that are at locations remote from the well.

Figure 9:
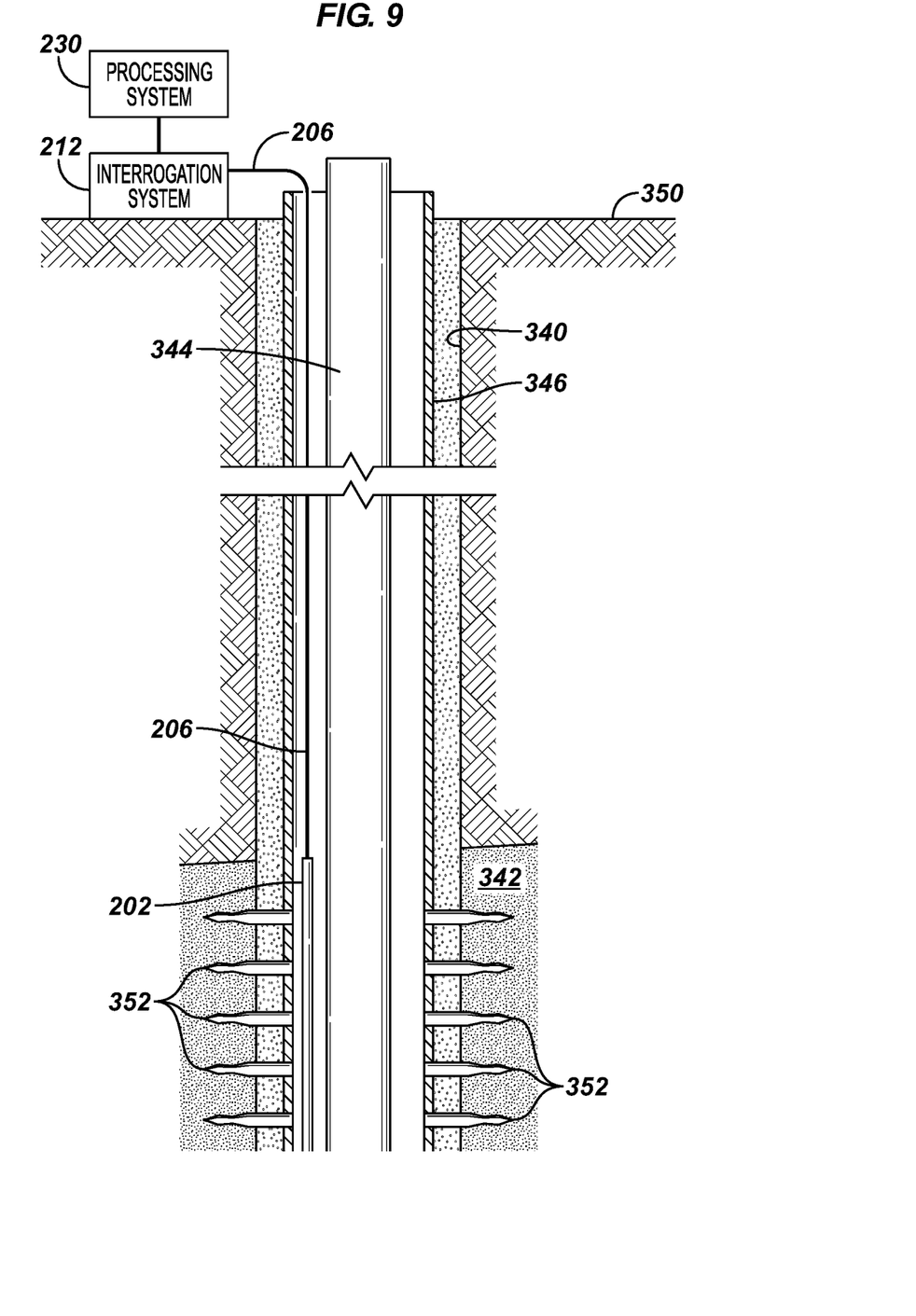
FIG. 9 is a schematic illustration of a multiple spectrum channel fiber optic monitoring system with the fiber optic sensor assembly deployed in a wellbore extending into a hydrocarbon-producing formation, in accordance with an embodiment.

For example, as shown in FIG. 9, a fiber optic cable, such as optical fiber 206 with sensor assembly 202 having multiple sensors, may be deployed in a wellbore 340 to observe physical parameters associated with a region of interest 342. In some embodiments, the fiber 206 and sensor assembly 202 may be deployed in the annulus between a production tubing 344 and a casing 346 as shown. An interrogation system 212 may be located at a surface 350 and coupled to the optical fiber 206 to transmit the interrogating pulses to the sensor assembly 202, and detect returned spectral components in the signals returned by the various sensors of the sensor assembly 202. The detected spectral components may be processed by the processing system 230 to determine the parameters of interest (e.g., temperature, pressure) in the manners described above. The processing system 230 may be co-located with the interrogation system 212, may be in the same locale as the system 212, or may be remotely located and the data representative of the detected components may be transmitted via satellite or other communication network to the remote location, such as a remote control center.

In the embodiment shown in FIG. 9, to reach the region of interest 342, the wellbore 340 is drilled through the surface 350 and the casing 346 is lowered into the wellbore 340. Perforations 352 are created through the casing 346 to establish fluid communication between the wellbore 340 and the formation in the region of interest 342. The production tubing 344 is then installed and set into place such that production of fluids through the tubing 344 can be established. Although a cased well structure is shown, it should be understood that embodiments of the subject matter of this application are not limited to this illustrative example. Uncased, open hole, gravel packed, deviated, horizontal, multi-lateral, deep sea or terrestrial surface injection and/or production wells (among others) may incorporate a multiple sensor, multiple channel fiber optic monitoring system as described. In many applications, temperature and/or pressure measurements obtained from the region of interest using a multiple sensor, multiple channel system may provide useful information that may be used to increase productivity. For instance, the measurement may provide an indication of the characteristics of a production fluid, such as flow velocity, flow composition, and inflow location. This information then can be used to implement various types of production or remedial operations, such as controlling valves to prevent production from certain zones, control the flow rate, and/or to control an injection profile.

While the subject matter of this application has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of this application.

What is claimed is:

1. A method of measuring at least one parameter in a region of interest, comprising:
launching an optical pulse into an optical fiber deployed in a wellbore formed in the region of interest, the optical fiber having a plurality of first fiber optic sensors and a plurality of second fiber optic sensors disposed along its length, wherein each of the first fiber optic sensors generates a first spectral response to the optical pulse in a first optical spectrum window, and wherein each of the second fiber optic sensors generates a second spectral response to the optical pulse in a second optical spectrum window different than the first optical spectrum window;

measuring the first spectral responses in a first optical spectrum channel having a first optical bandwidth sufficient for the first optical spectrum window;

measuring the second spectral responses in a second optical spectrum channel having a second optical bandwidth sufficient for the second optical spectrum window, the measured first and second spectral responses providing indications of at least one parameter in the region of interest, and the first optical bandwidth being narrower than the second optical bandwidth; and processing the measured first spectral responses and second spectral responses to derive the indications of the at least one parameter in the region of interest, wherein the measured first spectral responses are processed to derive indications of temperature in the region of interest, and the measured second spectral responses are processed to derive indications of pressure in the region of interest.

2. The method as recited in claim 1, further comprising:

selecting for measurement in the first optical spectrum channel a first spectral response generated by a particular first fiber optic sensor based on a travel time of the optical pulse in the optical fiber; and selecting for measurement in the second optical spectrum channel a second spectral response generated by a particular second fiber optic sensor based on a travel time of the optical pulse in the optical fiber.

3. The method as recited in claim 1, further comprising:

amplifying the first spectral response selected for measurement in the first optical spectrum channel; and amplifying the second spectral response selected for measurement in the second optical spectrum channel.

4. The method as recited in claim 1, wherein the first fiber optic sensors are fiber grating sensors, and the second fiber optic sensors are polarimetric sensors.

5. The method as recited in claim 1, wherein the first fiber optic sensors are fiber grating sensors having first spectral responses around a first central wavelength, and the second fiber optic sensors are fiber grating sensors having second spectral responses around a second central wavelength.

6. An apparatus for detecting a parameter in a region of interest, comprising:

an optical source to launch an optical pulse into an optical fiber deployed in a wellbore formed in the region of interest, the optical fiber having first sensors and second sensors deployed along its length, each of the first sensors generating a first response to the optical pulse in a first optical spectrum range, and each of the second sensors generating a second response to the optical pulse in a second optical spectrum range;

a first optical spectrum channel having a narrow bandwidth to receive the first responses generated by the first sensors;

a second optical spectrum channel having a wide bandwidth to receive the second responses generated by the second sensors;

an amplifier to amplify the first responses received in the first optical spectrum channel separately from the second responses received in the second optical spectrum channel; and an optical spectrum analyzer to detect spectral components in the amplified first responses and the amplified second responses, the detected spectral components indicative of at least one parameter in the region of interest, wherein the detected spectral components in the first responses are indicative of temperature in the region of interest, and the detected spectral components in the second responses are indicative of pressure in the region of interest.

7. The apparatus as recited in claim 6, further comprising a processing system coupled to the optical spectrum analyzer to process the detected spectral components and provide indications of the at least one parameter.

8. The apparatus as recited in claim 6, further comprising a second amplifier to amplify the second responses received in the second optical spectrum channel.

* * * * *